July 10, 1962 G. M. LAURENCIN 3,043,460
LIFT TRUCKS WITH LIFT MEANS TRANSLATABLE IN THE
HORIZONTAL DIRECTION RELATIVE TO THE VEHICLE
Filed Nov. 4, 1959
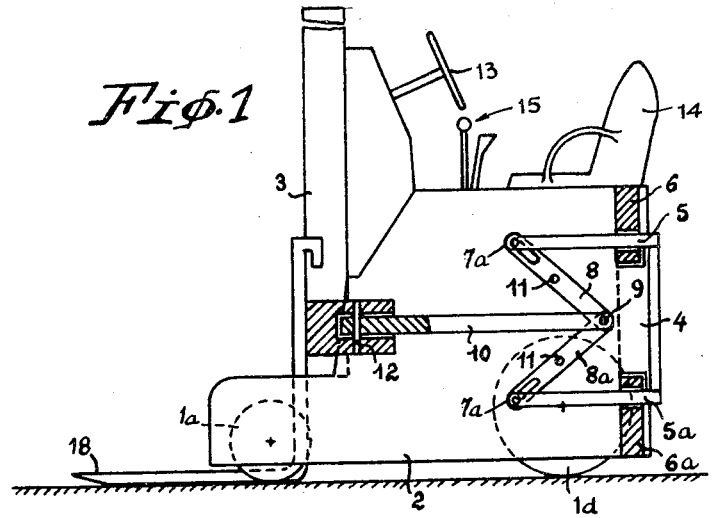
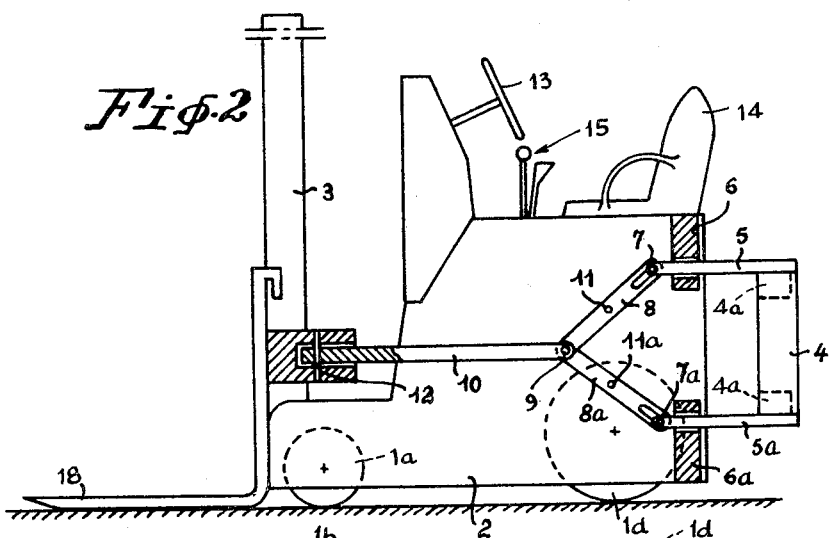
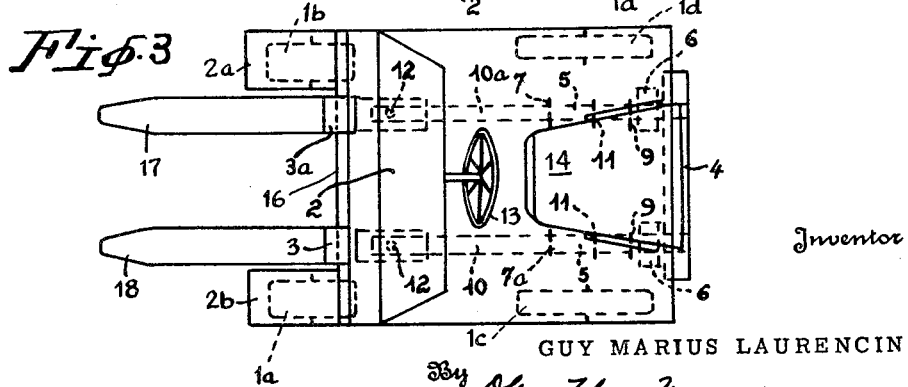
Inventor
GUY MARIUS LAURENCIN
By Otto John Munz
Attorney United States Patent Office 3,043,460
Patented July 10, 1962

3,043,460
LIFT TRUCKS WITH LIFT MEANS TRANSLATABLE IN THE HORIZONTAL DIRECTION RELATIVE TO THE VEHICLE
Guy Marius Laurencin, Lyon, France, assignor to Friedrich Jungheinrich, Hamburg-Billstedt, Germany
Filed Nov. 4, 1959, Ser. No. 850,888
Claims priority, application France Nov. 28, 1958
7 Claims. (Cl. 214—670)

This invention relates to lift trucks and, more particularly, to lift trucks of the type wherein the mast and lift forks or other lift means carried thereby, are translatable in the horizontal direction toward and from the chassis or frame of the vehicle.

Lift trucks of the type mentioned are widely used in factories, warehouses, shops and around docks and wharves, for the economical, low-cost handling of packaged, crated, and bagged material and its storage and removal from storage. The mast which supports and guides the lift forks or lift platform of the truck for vertical motion, is so mounted upon the chassis or frame of the vehicle that it can be moved forwardly from a retracted position over the wheels to an advanced position close to the load to be picked up, and, of course, returned with the load to retracted position over the wheels before starting to move. The translation of the mast in the horizontal direction as aforesaid is effected by the driving means of the truck, such as an electric motor or internal combustion engine, under control of the operator.

Such trucks can be made very short in proportion to their carrying capacity and are thus extremely versatile and highly maneuverable because of their short turning radius and their ability to get into corners and narrow passageways between stacked or stored articles to be handled. However, the capability for handling heavy loads in this type of truck is usually limited by the fact that when the mast is extended into forwardmost position to pick up a load, the load effects a moment about the axis of the front or leading wheels which tends to tilt the truck about such axis. Thus for any given truck, the load is limited to one which will not effect tilting of the truck. A counterweight may be used at the end of the truck remote from the mast, but excessive counterweights add to the cost of the vehicle, increase the cost of operation, render the vehicle less maneuverable and take up spaced needed for the operator and controls.

It is accordingly the principal object of this invention to provide a lift truck of the type aforesaid which enables the utilization to the maximum extent, of the lifting capacity of the truck.

Another object is to provide a lift truck of the movable-mast type which is of minimum overall length, highly maneuverable, versatile in use and capable of picking up loads up to its maximum capacity without danger of tilting.

Another object is to provide a lift truck of the aforesaid type which can handle increased loads without increase in over-all size and without loss of maneuverability and versatility.

Other objects and advantages of the invention will be apparent after a study of the following detailed description in connection with the accompanying drawing.

In the drawing:

FIGURE 1 is a side elevation of a lift truck embodying the invention, with the mast and counterweight shown in retracted position;

FIGURE 2 is a view corresponding to FIGURE 1 but showing the mast and counterweight in extended position to pick up a load; and FIGURE 3 is a top plan view corresponding to FIGURE 1, that is, with the mast, lift forks and counterweight in retracted position.

Referring in detail to the drawing, 2 identifies the chassis or frame of a lift truck mounted on front wheels 1a and 1b, and rear wheels 1c and 1d, and steerable by a steering wheel 13 under the control of an operator in seat 14, by means of control levers identified generally at 15.

As shown upon FIGURE 3, chassis 2 has projections 2a and 2b at its forward corners extending over wheels 1b and 1a, respectively, to define between the projections, a recess 16. A mast assembly comprising two rigidly interconnected, parallel vertical posts or elements 3 and 3a is mounted on chassis 2 for translation from a position retracted within recess 16 as in FIGURES 1 and 3, to a forward or pick-up position as shown upon FIGURE 2. In a manner well known in the art, lift forks 17 and 18 form a unitary assembly and are mounted upon the mast for vertical translation under control of hydraulic or other power means, not shown, from a position close to the floor to the maximum lift of the vehicle. Any suitable means may be employed for mounting the mast assembly for horizontal translation forwardly and rearwardly. For example, the chassis may be provided with horizontal channel members extending in the fore-and-aft direction and guiding heavy bars integrally connected with the masts 3 and 3a, to mount the latter for translation under the control of hydraulic or other means powered by the vehicle's motor or engine.

A counterweight 4 is mounted at the rear end of the vehicle for forward and rearward horizontal translation, by means of upper and lower pairs of arms 5 and 5a shown fixedly secured to the counterweight and extending forwardly in parallel relation through guide bearings or slots formed in upper and lower pairs of members 6 and 6a. From FIGURE 3 it will be noted that there are two arms 5 each attached to the respective upper right and left corners of the counterweight, and two arms 5a each attached to the respective lower right and left corners thereof. The two upper guide members 6 and the two lower ones 6a are rigidly attached to and form a part of the chassis of the truck.

Two pairs of links 8 and 8a are pivoted at 11 and 11a, respectively, to a convenient part of the chassis or body of the truck. These links overlap at their inner ends where they are pivotally connected as at 9, to the rearward end of a bar 10. Link 8 has a sliding pivotal connection at 7 to the inner end of arm 5. Likewise link 8a has a sliding pivotal connection at 7a to the inner end of arm 5a. The other end of bar 10 is connected at 12 with mast element 3.

Referring more particularly to FIGURE 3, bar 10a is similarly connected with the right links 8, 8a at its rearward end and with mast element 3a at its forward end. Thus, in a manner obvious from inspection and comparison of FIGURES 1 and 2, counterweight 4 is translated forwardly and rearwardly as the mast is moved rearwardly and forwardly, respectively. When the mast is fully retracted toward the truck chassis, as in FIGURE 1, counterweight 4 is substantially flush with the rear end of the truck and therefore does not increase its over-all length during travel, or detract from its maneuverability. In this position, recesses 4 and 4a in the upper and lower portions of the weight, receive and fit over portions of the bearing members 6 and 6a respectively.

As the mast and its forks are moved forwardly to pick up a load, the counterweight is simultaneously moved rearwardly until, when the mast is fully advanced, the counterweight is in its rearwardmost position to greatly increase its moment about the forward wheels 1a and 1b. Thus the truck is able to pick up a much larger load than it would otherwise be able to do because the moment applied by the load about the axis of the wheels 1a and 1b never exceeds the opposite moment applied by the counterweight assisted, of course, by the weight of the truck. In this way, the maximum load capacity of the truck may be utilized without danger of tilting about the front wheels and without increasing the overall length of the vehicle when in running or traveling condition or its weight and maneuverability.

While there has been shown a preferred form of the invention it will be understood by those skilled in the art after a study of the foregoing detailed description, that numerous other mechanimal, hydraulic and electrical means may be adapted and employed to effect the simultaneous opposite motions of the mast and counterweight. For example, rack elements connected with the mast and counterweight respectively, may engage opposite sides of a common, power-driven pinion to equally and oppositely translate the mast and weight; or they may be connected with independent synchronous follow-up motors under the control of a single rheostat or switch. Alternatively the mast and counterweight may be connected with the piston rods of two hydraulic rams under control of a single valve so that they are positively and oppositely driven on opening of the valve. Another form of operating mechanism might be a single power-operated rod extending longitudinally of the vehicle and journaled for rotation. The two ends of the rods would have threads of opposite hand. One end of the rod would engage a nut element fixed with the mast and the other end with a nut element fixed with the counterweight.

For the foregoing reasons the disclosure should be taken in an illustrative rather than a limiting sense; and it is my desire and intention to reserve all modifications and substitutions of equivalents within the scope of the subjoined claims.

Having now fully disclosed the invention, what I claim and desire to secure by Letters Patent is:

1. In a wheeled load-carrying vehicle, load-supporing and elevating means mounted on said vehicle for movement forwardly and rearwardly with respect thereto and effective to vary the moment on said vehicle in one direction about a horizontal axis through its centroid, a mass movably mounted on and relatively to said vehicle to apply a varying moment in an opposite direction about said axis, and means positively connecting said load-supporting and elevating means with said mass for opposite movement to simultaneously and oppositely vary said moments.

2. In a lift truck, a chassis, a mast, means mounting said mast on said chassis for translation in a first horizontal direction, a counterweight, means mounting said counterweight on said chassis for movement in said first horizontal direction, and means directly interconnecting said mast and said counterweight to simultaneously and synchronously oppositely move said mast and counterweight on and relatively to said chassis.

3. In a lift truck, a wheel-supported chassis, a substantially vertical mast assembly mounted on said chassis for translation in the fore-and-aft horizontal direction between a retracted position and a loading position forwardly advanced from one end of said chassis, a counterweight mounted on said chassis at the other end of said chassis for movement in said direction, and means directly connecting said mast assembly and counterweight for simultaneous opposite movement.

4. In a self-propelled lift truck, a wheel-supported chassis, a mast carrying lifting means and mounted on said chassis for translation in a horizontal direction from a retracted position, forwardly to an advanced position to pick up a load, a counterweight mounted at the rear of said vehicle for translation in said direction from a retracted position within the confines of said frame, rearwardly to a position outwardly of said frame, and means directly connecting said mast and counterweight for simultaneously opposite translation.

5. In a self-propelled, self-powered, wheeled lift truck, a body frame, a mast assembly mounted on said frame for horizontal fore-and-aft translation between a first retracted position over said frame to a second position forwardly advanced from said frame, a counterweight, a plurality of parallel arms fixed with said counterweight and extending horizontally forwardly therefrom, bearing means fixed with the rearward end of said frame and slidably receiving said arms to mount said counterweight for horizontal translation from a first position within said frame to a second position projected rearwardly therefrom, and a connection between said mast assembly and said arms and operable to translate said counterweight simultaneously with and oppositely to, translation of said mast assembly.

6. In a self-propelled lift truck, a frame, a mast mounted on said frame for translation from a first retracted position, horizontally forwardly to a second load pick-up position, a counterweight, first and second pairs of laterally-spaced arms fixed with said counterweight and extending in parallelism forwardly therefrom, bearing means fixed with said frame at the rear thereof and slidably mounting said arms whereby said counterweight may be translated from a first retracted position within a recess in said frame, to a second position rearwardly of said frame, first and second pairs of links each pivoted to said frame on a discrete axis, a sliding pivotal connection between an end of each link and a respective one of said arms, a pair of parallel bars longitudinally slidable on said frame and connected at their forward ends with said mast, and means pivotally connecting the ends of each said pair of links to the rearward end of a respective one of said bars, whereby said mast and counterweight are simultaneously oppositely moved.

7. In a self-propelled lift truck, a wheel-supported chassis, a load-lifting mast mounted on said chassis for movement relatively thereto, from a first retracted position, horizontally forward to a second advanced loading position, a counterweight mounted on said chassis rearwardly of said mast for movement relatively to said chassis, horizontally from a first, retracted position to a second, rearwardly-projected position, and mechanical means interconnecting said mast and said counterweight and operating positively to effect movement of said counterweight between its said first and second positions in synchronism with movement of said mast between its said first and second positions.

References Cited in the file of this patent
UNITED STATES PATENTS

| | | |
|---|---|---|
| 219,691 | Coudoint-Gougeul | Sept. 16, 1879 |
| 2,320,601 | Howell | June 1, 1943 |
| 2,759,563 | Marnon | Aug. 21, 1956 |
| 2,828,879 | Arnot | Apr. 1, 1958 |
| 2,859,890 | Renard | Nov. 11, 1958 |
| 2,916,172 | Locke | Dec. 8, 1959 |

FOREIGN PATENTS

| | | |
|---|---|---|
| 1,066,492 | France | Jan. 20, 1954 |
| 302,259 | Switzerland | Oct. 15, 1954 |